March 28, 1944.  H. H. THORNE  2,345,367
SCRIBING TOOL
Filed Jan. 29, 1942
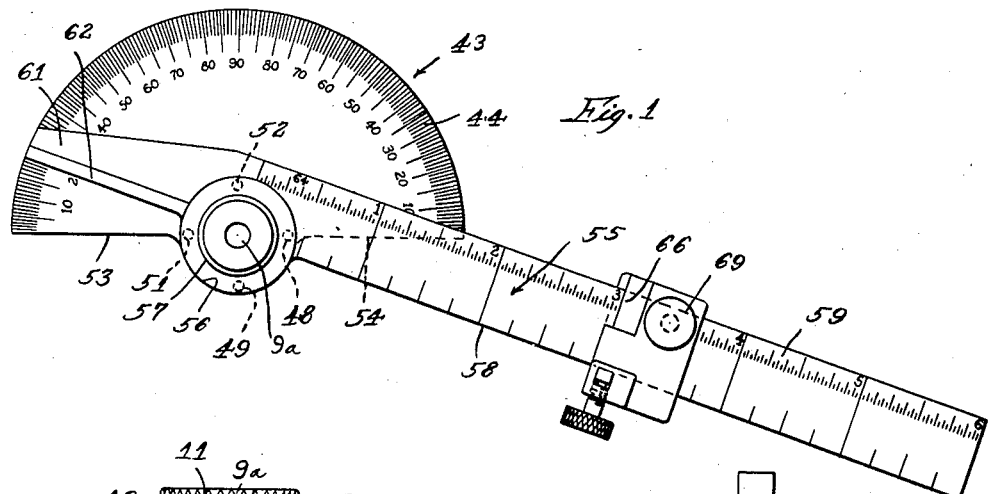
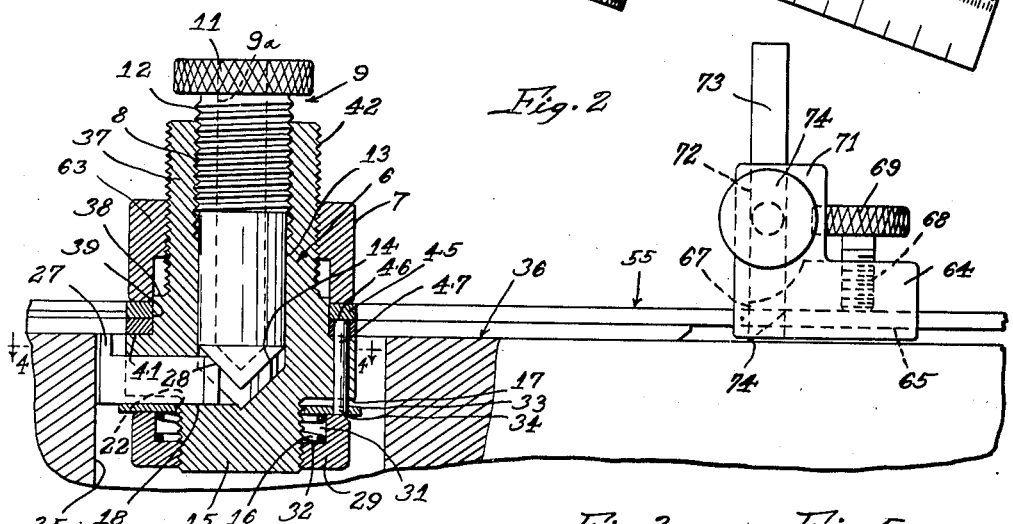
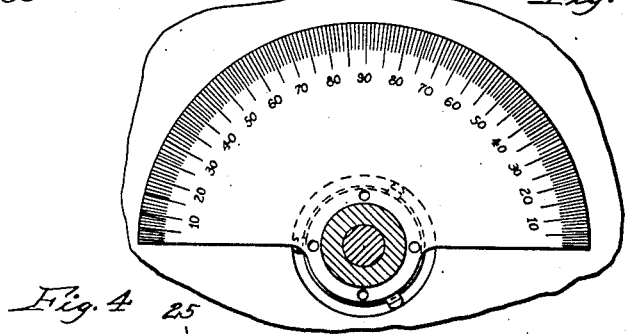
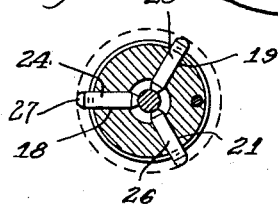
Inventor:
Harry H. Thorne
By
McCanna, Wintercorn & Morsbach
Attys.

Patented Mar. 28, 1944

2,345,367

UNITED STATES PATENT OFFICE 2,345,367

SCRIBING TOOL

Harry H. Thorne, Rockford, Ill.

Application January 29, 1942, Serial No. 428,748

11 Claims. (Cl. 33—26)

This invention relates to scribing tools of the type suitable for use by tool and die makers and others working in metal as well as wood for the purpose of laying out work and marking a work piece, and is adapted to perform combined functions of a protractor, ruler and compass, as well as additional functions.

An important object of the invention is the provision of a scribing tool adapted to be fixed in an opening of a work piece for the purpose of scribing radii on the work piece, laying off angles with respect thereto, scribing circles about the center of the opening, and analogous operations.

A further object of the invention is the provision of a tool comprising a protractor and a compass ruler arranged about a common axis, together with means for securing the protractor and the ruler in fixed position, and means for securing the protractor and ruler in position against a work piece.

Another object of the invention is the provision of a tool of the character described having improved means for securing the tool in position in the work piece in such manner that the ruler and protractor may be shifted in position without disturbing the position of said means on the work piece.

Another object of the invention is the provision of a tool of the class described so constructed that the carrier is centered in the opening of a work piece and carries a protractor or a ruler member or both, arranged so that lines scribed along the edge of the protractor or ruler are radially disposed with respect to the opening.

Other objects and advantages will appear from the following description and the accompanying drawing, in which—

Figure 1 is a top view of a tool embodying my invention, this figure showing the tool substantially full size;

Fig. 2 is an enlarged vertical section through a tool showing the same in position on the work piece;

Fig. 3 is a top view partly in section showing a fragment of the work piece, the tool having the ruler removed for separate use of the protractor;

Fig. 4 is a section taken substantially on the line 4—4 of Fig. 2, and

Fig. 5 is a section similar to Fig. 4 showing the manner in which the tool is adapted for accommodation in large sized holes.

The present and preferred embodiment of the invention includes a hub designated generally by the numeral 6 having a central axially disposed opening 7 having a smooth internal wall adjacent the lower portion of the opening, the outer end of the bore being internally threaded as indicated at 8. Positioned within the opening or bore 7 is a screw indicated generally by the numeral 9, in this instance having a knurled head 11, a threaded portion 12 adjacent to the head adapted to cooperate with the threaded portion 8 of the bore, and a portion 13 having a smooth external surface snugly received within the smooth lower end of the bore 7. The lower end of the screw is shaped in the form of an inverted cone as shown at 14. The hub 6 has a lower end of reduced diameter as shown at 15, this portion being externally threaded as shown at 16 and forming a shoulder as indicated at 17 between the portion 15 and the remainder of the hub. The hub is provided with a plurality of rectangular slots 18, 19 and 21 arranged in this instance at angles of 120° around the hub, as will be seen from Fig. 4 and connecting with the bore 7. The dimensions of these slots are substantially identical and comprise relatively narrow openings in a direction crosswise of the length of the hub and relatively long openings longitudinally of the hub. The slots are positioned at the junction between the portion 15 and the remainder of the hub and thus cut through the shoulder 17 as best shown in Fig. 2, extending into the portion 15 a short distance as indicated at 22. Positioned in the slots 18, 19 and 21 are blocks 24, 25 and 26 adapted to slide therein radially with respect to the hub with a snug fit, the outer ends of the blocks having upstanding shoulders 27 to increase the area of contact with the work and to prevent the blocks from sliding into the hub excessively, and to provide for engagement with their work pieces to bring the protractor flat against the work. The outer edges of the blocks are rounded or curved as shown in Fig. 4, and the inner ends of the blocks are provided with a cam surface disposed substantially at 45° with respect to the longitudinal axis of the hub 6, as indicated at 28, this angle being complementary to the angle of the conical end 14 of the screw. Disposed on the lower portion 15 of reduced diameter is a nut 29 having a recess 31 for the reception of a spring 32, the nut serving to urge the spring against a washer 33 which bears against the lower edges of the blocks 24 to 26, as will be seen from Fig. 2, the spring and washer thus providing a drag on the movement of the blocks, the degree of drag depending upon the tension of the nut 29. The hub carries a pin 34 depending from the shoulder 17 to engage an opening in the washer 33 and prevent the washer from turning with respect to the hub.

From this construction it will be seen that when the hub is inserted in an opening as indicated at 35 in a work piece designated generally by the numeral 36, rotation of the screw by means of the knurled head 11 causes the conical end 14 of the screw to act on the cam surfaces 28 of the blocks and thus urge the blocks radially outward to a uniform extent until the outer ends of the blocks engage against the inner surface of the hole 35. As the screw is rotated the uniform movement of the blocks causes the hub to be centered in the hole 35 so that the longitudinal center of the hub becomes the longitudinal axis of the hole 35, provided, of course, the hole 35 is cylindrical. When the screw is tightened the blocks are urged against the walls, causing the hub to be frictionally retained in a centered position on the work piece.

The hub 6 is provided with an upper end portion 37 of reduced diameter and an intermediate stepped portion therebelow providing a shoulder 38 and an annular bearing portion 39 terminating in a lower shoulder as indicated at 41. The portion 37 is provided with external threads as shown at 42, whereas the annular bearing portion 39 has a smooth cylindrical outer surface terminating in a smooth shoulder 41 in a plane at right angles to the longitudinal axis of the hub. A protractor, indicated generally by the numeral 43 having a graduated outer periphery 44 disposed through 180°, is provided with a central bearing ring 45 having a central opening 46, the center of which is the center about which the periphery of the protractor segment is formed. This opening 46 is of such size that the protractor is snugly received over the bearing portion 39 as shown in Fig. 2 so that the protractor may be rotated about the hub, the arrangement being such that the axis of the protractor corresponds to the axis of the hub, and consequently corresponds to the longitudinal centerline of the hole 35. The pin 34 projects upwardly as shown at 47 from the shoulder 41 and is adapted to be received in any of a plurality of holes 48, 49, 51 and 52, so as to locate the protractor at any 90° position. The protractor has a pair of edges 53 and 54 which constitute one side thereof and pass through the center about which the protractor is generated as shown in Figure 1, so that these edges may serve as straight edges against which the work may be described to produce lines which are radii with respect to the hub and with respect to the opening 35.

Disposed on the bearing portion 39 above the protractor 43 is a ruler indicated generally by the numeral 55. The ruler has a circular bearing surface 56 defining an opening 57, the center of which lies in the plane of the scribing edge 58 of the ruler so that lines scribed along the edge 58 will radiate from the center of the opening 57. The opening 57 is of such size as to closely receive the bearing portion 39 for rotation with respect thereto. The ruler has a graduated side as indicated at 59 and an end portion 61 projecting beyond the opening 57 so as to cooperate with the graduated scale 44 along the periphery of the protractor. The portion 61 has an edge 62 constituting a continuation of the edge 58 so that measurements may be made against the protractor either at the edge portion 62 or along the edge 58 depending upon the rotative position of the ruler with respect to the protractor. Positioned on the threaded upper end 37 is a knurled nut 63 engaging the external threads 42 and adapted when screwed down to tighten the ruler and the protractor against the shoulder 41 and thus retain the parts in fixed position. The knurled head 11 of the screw is smaller than the internal opening in the nut 63 so that the nut 63 can be unscrewed and removed to permit removal of the ruler without disturbing the position of the hub within the opening 35.

Positioned on the ruler 55 is a scriber adapted to cooperate with the scribing edge 58 and with the graduated scale 59, this scriber including a block designated generally by the numeral 64 having a rectangular slot 65 adjacent its lower surface shaped to snugly receive the ruler 55, as best shown in Fig. 2. The block has one edge notched away as indicated at 66 to provide a thin narrow edge 67 facilitating the reading of the position of the block against the scale 59. The block is also provided with a threaded opening 68 for the reception of a screw 69 having a knurled head, the screw being disposed to engage the ruler 55 to secure the scribing block in fixed position on the ruler. The block 64 has an upstanding sleeve portion 71 provided with a vertically disposed slot 72 adapted to receive a cutter 73, the sleeve 71 having a screw 74 provided with a knurled head for the purpose of adjusting the position of the cutter 73 with respect to the block. One side of the vertical opening 72 is coplanar with the edge 67 so that the projecting end 74 of the cutter when engaging the work as shown in Fig. 2 produces a line coplanar with the edge 67.

The screw 9 is provided with an axial opening 9a adapted for the reception of a pin for use with a transverse bar for scribing large arcs or circles, as will be apparent to those skilled in the art.

It will be seen that with the blocks 24 to 26 the tool is limited to use under conditions where the hole 35 falls within a limited range of size. The tool may be adapted for use with holes of larger size in the manner shown in Fig. 5, wherein blocks 75, 76 and 77 are employed substantially identical in shape with the blocks 24 to 26 with the exception of the length thereof, the length being substantially greater so as to be able to make contact with a materially larger hole as indicated at 78. In order to provide support for the outwardly disposed portions of the longer blocks I substitute for the washer 33 a washer 79 provided with outwardly disposed wings as shown at 81 which act to support the blocks. The washer 79 is otherwise identical with the washer 33 and is retained in position by means of the pin 34, as heretofore described.

Attention is directed to the fact that when the hub is secured in the opening of a work piece, the longitudinal centerline of the hub is automatically caused to correspond with the longitudinal centerline of the opening so that thereafter movement of the protractor or of the ruler will always occur about the centerline of the opening. Thus the arrangement is such that the hub may be quickly located and the work may be laid out on the work piece with substantially greater speed than with prior methods and tools. The tool thus brings about a substantial saving in time for tool and die makers, model and pattern makers, sheet metal workers and the like.

In certain types of work the tool serves to greatly increase the accuracy of the work because it gives an accurately located center from which to start the laying out operations. The tool is not only intended for use by scribing directly against the scribing edges of the protractor and the ruler, but will be found useful in connection with gauge blocks which can be seated against the scribing edge, and would also be used in connection with squares, triangles, other bevel protractors and the like for the reason that the ruler and the protractor can be held in fixed position on the hub for accurate work from the edge of the ruler.

I claim:

1. The combination in a tool of the character described of a hub shaped for reception in a hole of a work piece, means for centering and securing the hub therein, a protractor scale of substantially greater diameter than the hole to overlie the work piece in face contact therewith concentrically positioned on said hub for angular movement about the center thereof, said protractor scale having a scribing edge radiating from said center, and locating means acting between the hub and the protractor scale for locating the protractor scale with said scribing edge at any of a plurality of predetermined fixed angular positions with respect to the hub.

2. The combination in a tool of the character described of a hub adapted for reception in a hole of a work piece, means for centering and securing the hub therein, a protractor scale concentrically positioned on said hub for angular movement about the center thereof, said hub and said scale having interfitting shape characteristics to interfit in preselected angular positions, said protractor scale having a scribing edge radiating from said center, and a nut threaded on said hub shaped to engage said protractor scale and hold the same in fixed interfitted position with respect to said hub.

3. The combination in a tool of the character described of a hub adapted for reception in a hole of a work piece, means for centering and securing the hub therein, a protractor concentrically positioned on said hub for angular movement about the center thereof, said protractor having a scribing edge radiating from said center, a ruler rotatably positioned on said hub and rotatable thereon about the center of said hub as an axis, said ruler having a scribing straight edge disposed in a plane passing through said center for scribing radii with respect thereto in any rotative position of the ruler, said straight edge cooperating with said protractor to measure angles thereagainst, and means adjustably positioned along the straight edge of said ruler for marking the work.

4. The combination in a tool of the character described of a hub shaped for reception in a hole of a work piece, said hub having an annular bearing surface concentric with the centerline thereof and an annular shoulder adjacent thereto, means on said hub for centering and securing the hub in said hole, and a protractor comprising a plate in the shape of a half disk having an arcuate edge, opposed spaced straight edges and an arcuate band between said straight edges defining in part an opening on the center of curvature of said arcuate edge of a size to be snugly received around said bearing surface and against said shoulder whereby lines scribed along said straight edges fall on a straight line through said center of curvature.

5. The combination in a tool of the character described of a hub shaped for reception in a hole of a work piece, said hub having an annular bearing surface concentric with the centerline thereof and an annular shoulder adjacent thereto, means on said hub for centering and securing the hub in said hole, a protractor comprising a plate in the shape of a half disk having an arcuate edge, opposed spaced straight edges and an arcuate band between said straight edges defining in part an opening on the center of curvature of said arcuate edge of a size to be snugly received around said bearing surface and against said shoulder whereby lines scribed along said straight edges fall on a straight line through said center of curvature, said protractor and shoulder having cooperating pin and openings for locating said protractor in any of a plurality of relative angular positions with respect to said hub, and a nut on said hub for tightening the protractor against the shoulder to hold the protractor in located position.

6. The combination in a tool of the character described of a hub shaped for reception in a hole of a work piece, said hub having an annular bearing surface concentric with the centerline thereof and an annular shoulder adjacent thereto, means on said hub for centering and securing the hub in said hole, a protractor comprising a plate in the shape of a half disk having an arcuate edge, opposed spaced straight edges and an arcuate band between said straight edges defining in part an opening on the center of curvature of said arcuate edge of a size to be snugly received around said bearing surface and against said shoulder whereby lines scribed along said straight edges fall on a straight line through said center of curvature, a ruler having a straight edge and an arcuate band disposed thereon intermediate the ends thereof defining an opening having its center in line with the straight edge thereof, said opening being of a size to be snugly received on said annular bearing surface, above said protractor, a scriber on said ruler, and a nut on said hub for securing said protractor, ruler and hub in fixed relative positions.

7. The combination in a scribing tool of a hub adapted for reception in a hole of a work piece, said hub having a plurality of radially disposed slots, blocks disposed in said slots, and adapted to project therefrom, means resiliently bearing against the sides of said blocks to yieldingly retain the same in said slots, means within said hub for moving said blocks radially outward to a uniform extent into contact with the sides of said hole to center the hub in said hole and secure the same therein, and a protractor positioned on said hub for scribing said work piece.

8. The combination in a tool of the character described of a hub adapted for reception in a hole of a work piece, said hub having a concentric annular shoulder, means for centering and securing the hub in said hole, a protractor scale concentrically positioned on said hub in face contact against said shoulder for angular movement about the center thereof, said scale having a scribing edge radiating from said center and locating means disposed between said scale and said shoulder for locating the scale with said scribing edge at any of a plurality of predetermined fixed angular positions with respect to the hub.

9. The combination in a tool of the character described of a hub adapted for reception in a hole of a work piece, said hub having an annular bearing surface concentric with the center line thereof and an annular shoulder adjacent thereto, means for centering and securing the hub in said hole, a protractor scale concentrically positioned on said hub having an opening for reception of said bearing surface and adapted to seat against said shoulder for angular movement about the center of said hub, said scale having a scribing edge radiating from said center, a ruler having an opening for the reception of said bearing surface adapted to seat in face to face contact with said protractor scale, locating means disposed between said hub and said protractor scale for locating the scale with said scribing edge at any of a plurality of predetermined fixed angular positions with respect to the hub, and a screw-threaded nut on said hub for engagement with said rule to hold the rule and scale in located engagement with said locating means.

10. The combination in a scribing tool of a hub adapted for reception in a hole of a work piece, said hub having a central bore and a plurality of slots extending radially from said bore, blocks slidably positioned in said slots adapted to project therefrom, said blocks having tapered ends within said bore, a screw in said bore having a conical end adapted to engage the tapered ends of said blocks and having threaded engagement with said bore for advancement of the screw in the bore to uniformly force said blocks outwardly to engage the walls of said hole to center the hub in the hole and secure the same therein, and means on said hub for scribing said work piece.

11. The combination in a scribing tool of a hub adapted for reception in a hole of a work piece, said hub having a central bore and a plurality of slots extending radially from said bore, blocks slidably positioned in said slots adapted to project therefrom, said blocks having tapered ends within said bore, a screw in said bore having a conical end adapted to engage the tapered ends of said blocks and having threaded engagement with said bore for advancement of the screw in the bore to uniformly force said blocks outwardly to engage the walls of said hole to center the hub in the hole and secure the same thereon, means on said hub for scribing said work piece, and spring means on said hub for retaining said blocks against free longitudinal movement.

HARRY H. THORNE.